(12) United States Patent
Landphair et al.

(10) Patent No.: US 7,273,016 B2
(45) Date of Patent: Sep. 25, 2007

(54) VARIABLE SPEED DRIVE FOR AGRICULTURAL SEEDING MACHINES

(75) Inventors: Donald Keith Landphair, Bettendorf, IA (US); Christopher Allen Myers, Moline, IL (US)

(73) Assignee: Deere & Company, Moline, IL (US)

( * ) Notice: Subject to any disclaimer, the term of this patent is extended or adjusted under 35 U.S.C. 154(b) by 128 days.

(21) Appl. No.: 10/850,182

(22) Filed: May 20, 2004

(65) Prior Publication Data

US 2005/0257725 A1 Nov. 24, 2005

(51) Int. Cl.
*A01C 7/00* (2006.01)
*A01C 9/00* (2006.01)

(52) U.S. Cl. .................... 111/185; 221/211
(58) Field of Classification Search ............. 111/177, 111/170, 174, 178, 179, 183, 184, 185; 221/211
See application file for complete search history.

(56) References Cited

U.S. PATENT DOCUMENTS

| | | | | |
|---|---|---|---|---|
| 1,984,830 A | | 12/1934 | Higley ..................... 475/21 |
| 3,744,569 A | * | 7/1973 | Ehrlich ..................... 172/42 |
| 3,913,503 A | * | 10/1975 | Becker ..................... 111/77 |
| 4,122,974 A | | 10/1978 | Harbert et al. .............. 221/13 |
| 4,251,014 A | | 2/1981 | Salley et al. ................ 222/615 |
| 4,354,564 A | * | 10/1982 | Watanabe et al. .......... 180/19.1 |
| 4,508,243 A | * | 4/1985 | Deutsch et al. ............. 222/142 |
| 4,561,565 A | * | 12/1985 | Wolf et al. .................... 222/28 |
| 4,601,372 A | * | 7/1986 | Swales et al. ............. 192/69.7 |
| 4,729,493 A | * | 3/1988 | Cole et al. .................. 221/185 |
| 4,779,471 A | * | 10/1988 | Rettig ........................... 74/13 |
| 4,917,200 A | | 4/1990 | Lucius ....................... 180/6.2 |
| 5,025,951 A | | 6/1991 | Hook et al. .................. 221/13 |
| 5,390,751 A | | 2/1995 | Puetz et al. ................ 180/6.48 |
| 5,542,364 A | * | 8/1996 | Romans ...................... 111/185 |
| 5,915,313 A | * | 6/1999 | Bender et al. ............... 111/178 |
| 6,003,454 A | * | 12/1999 | Ozers et al. ................ 111/184 |
| 6,070,539 A | * | 6/2000 | Flamme et al. ............. 111/177 |
| 6,193,175 B1 | * | 2/2001 | Andersson et al. .......... 239/656 |
| 6,527,205 B2 | * | 3/2003 | Andersson et al. .......... 239/656 |
| 6,609,468 B1 | * | 8/2003 | Meyer et al. ............... 111/174 |
| 6,647,904 B1 | * | 11/2003 | Mariman et al. ............. 111/62 |
| 6,715,433 B1 | * | 4/2004 | Friestad ...................... 111/177 |
| 6,722,445 B2 | * | 4/2004 | Ohta et al. .................... 172/42 |
| 6,834,749 B1 | * | 12/2004 | Johnson ....................... 192/20 |
| 6,926,091 B2 | * | 8/2005 | Lee ............................... 172/52 |

* cited by examiner

*Primary Examiner*—Christopher J. Novosad
(74) *Attorney, Agent, or Firm*—Taylor & Aust, P.C.

(57) ABSTRACT

An agricultural seeding machine includes a mechanical drive; a seed meter including a driven shaft; and a planetary gear set. The planetary gear set includes an input shaft connected with the drive, an output shaft connected with the driven shaft, a ring gear, and a motor coupled with a ring gear.

17 Claims, 3 Drawing Sheets

VARIABLE SPEED DRIVE FOR AGRICULTURAL SEEDING MACHINES

FIELD OF THE INVENTION

The present invention relates to agricultural seeding machines, and, more particularly, to an input drive for a seed meter in such an agricultural seeding machine.

BACKGROUND OF THE INVENTION

An agricultural seeding machine such as a row crop planter or grain drill places the seeds at a desired depth within a plurality of parallel seed trenches formed in the soil. In the case of a row crop planter, a plurality of row crop units are typically ground driven using wheels, shafts, sprockets, transfer cases, chains and the like. Each row crop unit has a frame which is movably coupled with a tool bar. The frame may carry a seed hopper, herbicide hopper and/or insecticide hopper. The mechanisms necessary to properly meter the seeds, dispense the seeds at a predetermined rate and place the seeds at predetermined relative locations within a seed trench are relatively complicated.

The mechanisms associated with metering and placing the seeds generally can be divided into a seed metering system and a seed placement system which are in communication with each other. The seed metering system, simply called a seed meter herein, receives the seeds in a bulk manner from a seed hopper. Different types of seed meters may be used such as seed plates, finger plates, and seed discs. Regardless of which type seed meter is used, the seeds are singulated and discharged at a predetermined rate to the seed placement system.

It is known to drive a seed meter with a variable rate drive using hydraulic motors and values. The use of such hydraulic systems for variably driving a seed meter drives all row units at the same population. Such systems may be relatively expensive, complicated and lack control on an individual row unit basis.

It is also known to provide an electric motor at each row unit for the purpose of driving the seed meter. Driving each seed meter with a corresponding electric motor requires a relatively large electric motor which consumes an excessive amount of electric power which is not typically available for current traction units (e.g., tractor) used for pulling the seeding machine. Using an all-electrical drive of this type therefore is not practical with existing traction units.

What is needed in the art is a drive for a seed meter which may be individually controlled but still derives the primary input power from the ground driven components of the seeding machine.

SUMMARY OF THE INVENTION

The present invention provides an electromechanical variable speed drive for a seed meter in a seeding machine which utilizes ground driven components as the primary power input source, but variably controls the output speed to the seed meter using an electric motor and planetary gear set.

The invention comprises, in one form thereof, an agricultural seeding machine including a mechanical drive; a seed meter including a driven shaft; and a planetary gear set. The planetary gear set includes an input shaft connected with the drive, an output shaft connected with the driven shaft, a ring gear, and a motor coupled with a ring gear.

An advantage of the present invention is that the primary input power to the seed meter is derived from the mechanical ground drive and the rotational speed of the input power is controlled using a smaller electric motor.

Another advantage is that the planetary gear set may be relatively small and compact, thus not affecting the overall size of the row unit.

Yet another advantage is that the electric motor which controls the rotational speed of the output shaft from the planetary gear set may be controlled using a feedback loop dependent upon the operating speed of the seed meter.

DESCRIPTION OF THE PREFERRED EMBODIMENT

Figure 1:
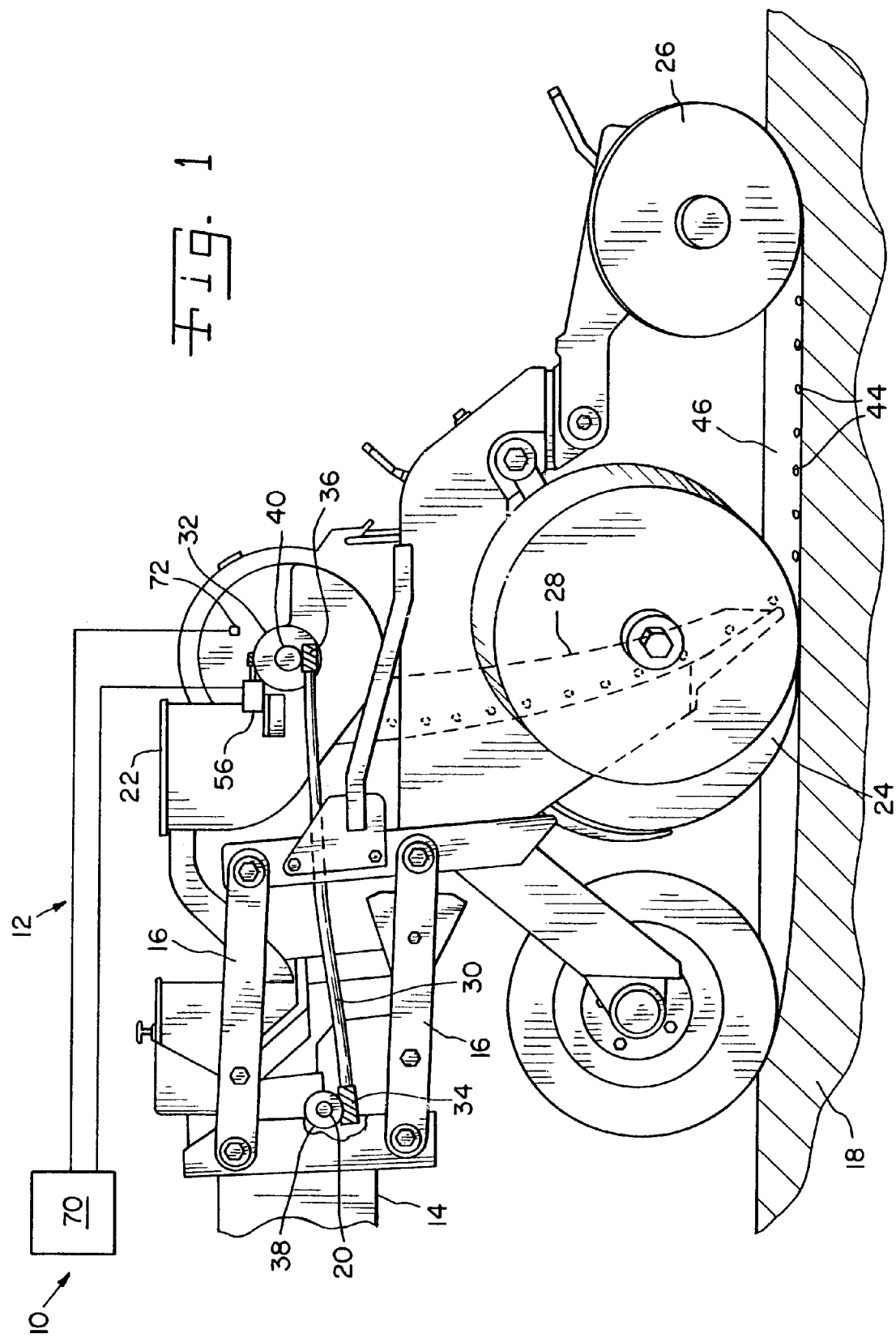
FIG. 1 is a side view of a row unit in an agricultural seeding machine, including an embodiment of a variable speed drive coupled with the seed meter.
Figure 2:
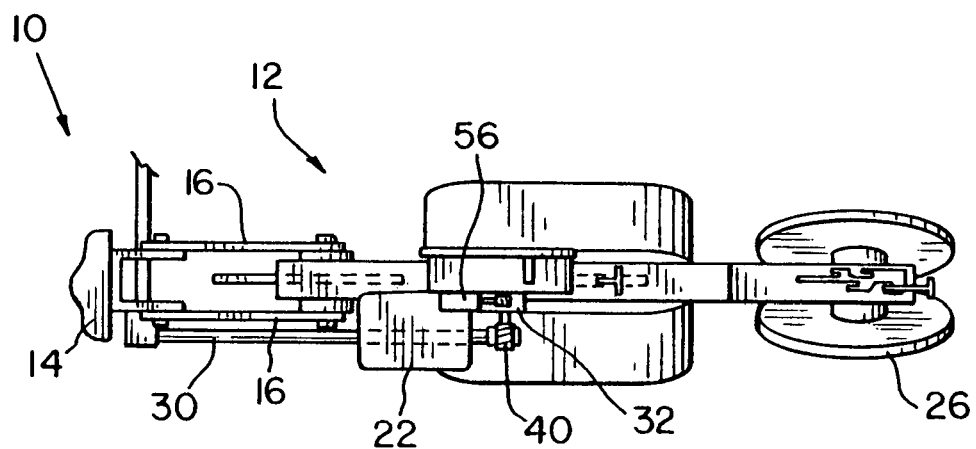
FIG. 2 is a top view of the row unit shown in FIG. 1.

Referring now to the drawings, and more particularly to FIGS. 1 and 2, there is shown an embodiment of an agricultural seeding machine 10 of the present invention. In the embodiment shown, seeding machine 10 includes a plurality of individual row units 12 coupled with a tool bar or frame 14. Each row unit 12 is typically configured substantially identical to each other, and therefore only a single row unit 12 is shown and described in the drawings.

Row unit 12 is coupled with frame 14 through pivotal linkage elements 16, and thereby is moveable in generally vertical up and down directions to follow the contour of soil 18. A ground driven main shaft 20 runs along the backside of frame 14 and is the primary source of input power to each seed meter 22.

Each row unit 12 also includes other components such as trench openers 24, trench closers 26, a drop tube 28, etc. which may be of conventional design and therefore not described in further detail herein.

The terms "drive" and "driven" are used herein with respect to the mechanical transfer of power between flexible shaft 30, planetary gear set 32 and seed meter 22. Looking at each component individually, shaft 30 has an input bevel gear 34 which is driven by main shaft 20, and an output bevel gear 36 which acts as the drive to the next downstream component, gear set 32. Gear set 32 has an input shaft 42 which is driven by gear 36, and an output shaft 52 which drives the next downstream component, seed meter 22. Seed meter 22 has an input shaft 48 which is driven by output shaft 52 of gear set 32.

Figure 3:
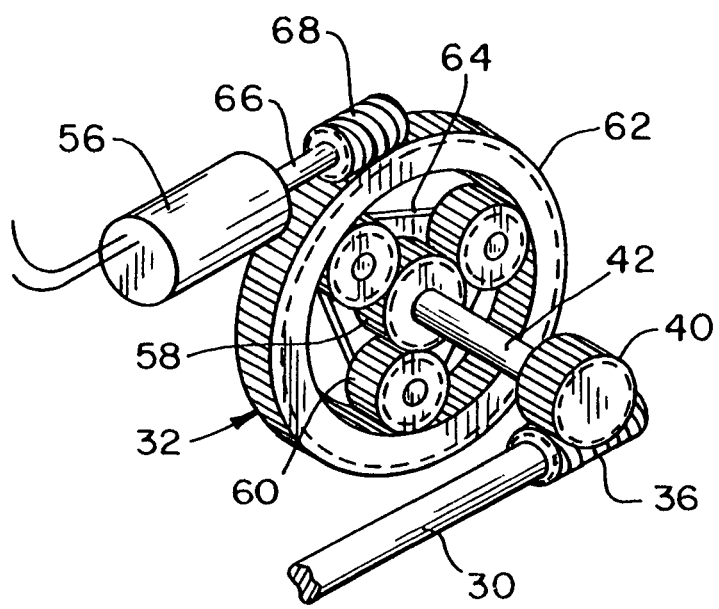
FIG. 3 is a perspective view of the planetary gear set engaged by the electric motor.

For each row unit 12, an intermediate drive in the form of a flexible shaft 30 interconnects main shaft 20 with a planetary gear set 32. Flexible shaft 30 includes a pair of bevel gears 34 and 36 at each end thereof. Bevel gear 34 engages a corresponding mating gear 38 carried by main shaft 20. On the other end, bevel gear 36 engages a corresponding mating gear 40 attached to a distal end of an input shaft 42 to planetary gear set 32 (FIG. 3).

In the embodiment shown, the intermediate drive between main shaft 20 and planetary gear set 32 is defined by flexible shaft 30. However, it is to be understood that the intermediate drive may be differently configured, such as a chain drive or any other suitable configuration.

Figure 4:
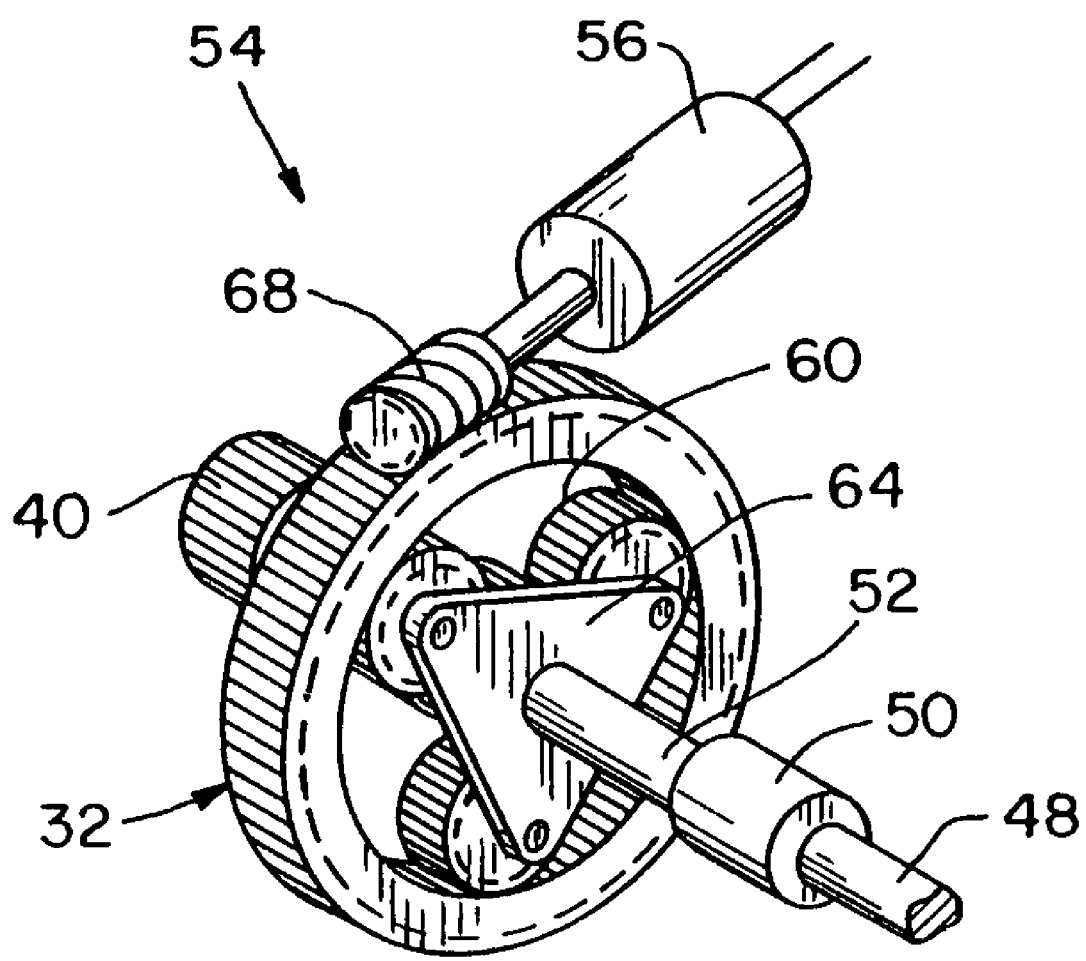
FIG. 4 is another perspective view of the planetary gear set shown in FIG. 3.

Seed meter 22 is used to space seeds 44 at an average predetermined distance from each other within seed trench 46, which in turn results in a predetermined seed population within a unit area (e.g., acre) in soil 18. Seed meter 22 generally includes a seed plate or other similar rotatable structure which is used to segregate and to drop seeds into seed tube 28 where they fall by gravity into seed trench 46. Regardless of the particular configuration, seed meter 22 includes a driven shaft 48 which is coupled by suitable coupler 50 through an output shaft 52 of planetary gear set 32 (FIG. 4). Coupler 50 is shown as a sleeve for simplicity of illustration, but preferably is a quick detach coupler allowing seed meter 22 to be quickly and easily coupled and decoupled from planetary gear set 32.

An electromechanical variable speed drive 54 is generally defined by planetary gear set 32 and an electric motor 56. Planetary gear set 32 is shown with a housing in FIGS. 1 and 2, which is removed in FIGS. 3 and 4 for illustration. Planetary gear set 32 includes a sun gear 58, a plurality of planetary gears 60 (three in the embodiment shown), and a ring gear 62. Planetary gears 60 engage with teeth at the outside periphery of sun gear 58 and also engage with teeth at the inside periphery of ring gear 62. Each planetary gear 60 individually rotates about its own axis, and also translationally moves in a concentric circle about sun gear 58. Each planetary gear 60 is coupled with a plate 64, which rotates and causes rotational movement of output shaft 52.

The translationally concentric motion of planetary gears 60 about sun gear 58 also causes rotation of ring gear 62. Without an external force being applied to ring gear 62, the rotational speed of ring gear 62 would reach a steady state condition depending upon the current ground drive conditions. However, according to an aspect of a present invention, electric motor 56 is used to accelerate or brake ring gear 62. This in turn causes the translationally concentric movement of planetary gears 60 to speed up or slow down, which in turn controls the rotational speed of plate 64 and output shaft 52 from planetary gear set 32.

Electric motor 56 has a drive shaft 66 coupled with a worm gear 68. Worm gear 68 enmeshes with a plurality of teeth on an outer periphery of ring gear 62. Depending upon the rotational drive speed of drive shaft 66, the rotational speed of ring gear 62 can be accelerated or decelerated (i.e., braked).

A controller 70 is electrically coupled with electric motor 56, and controllably operates electric motor 56 to speed up or slow own rotation of ring gear 62. This in turn controls the translational concentric motion of planetary gears 60 and output shaft 52. In this matter, the rotational drive speed of seed meter 22 is controlled.

Controller 70 is also electrically coupled with a sensor 72 which is positioned to sense a speed of seed meter 22, and optionally a ground speed sensor (not shown, such as a GPS sensor, ground driven sensor, etc.). Sensor 72 may be positioned to directly sense the rotational speed of a seed disc (as shown), or directly sense the rotational speed of driven shaft 48, etc.

During use, main shaft 20 is ground driven, and in turn rotatably drives flexible shaft 30. Bevel gear 36 of flexible shaft 30 drives gear 40 attached to the distal end of input shaft 42 to planetary gear set 32. Planetary gear set 32 is controllably driven in a manner as described above, preferably with a feedback loop using sensor 72, and provides rotational output power through output shaft 52 to driven shaft 48 of seed meter 22. The operating speed of seed meter 22 is sensed using sensor 72 and a rotational speed of ring gear 62 is controllably operated using controller 70 and electric motor 56. The operating speed of seed meter 22 can therefore be sped up or slowed down to place seeds 44 within seed trench 46 at a desired population rate.

Having described the preferred embodiment, it will become apparent that various modifications can be made without departing from the scope of the invention as defined in the accompanying claims.

The invention claimed is:

1. An agricultural seeding machine, comprising:
    a mechanical drive providing primary power;
    a seed meter, including a driven shaft;
    a planetary gear set including an input shaft connected with said drive, an output shaft connected with said driven shaft, a ring gear, and a motor coupled with said ring gear, said motor providing a secondary power resulting in regulating movements to said ring gear to thereby regulate a speed of said driven shaft.

2. The agricultural seeding machine of claim 1, wherein said planetary gear set includes a sun gear and a plurality of planetary gears interconnecting said sun gear and said ring gear, said input shaft being coupled with said sun gear.

3. The agricultural seeding machine of claim 2, wherein said output shaft is coupled with said planetary gears.

4. The agricultural seeding machine of claim 1, wherein said drive includes one of a flexible shaft and a chain connected with said input shaft.

5. The agricultural seeding machine of claim 1, wherein said drive includes a ground driven main shaft and a flexible shaft coupled with said main shaft, said flexible shaft coupled with said input shaft of said planetary gear set.

6. The agricultural seeding machine of claim 1, wherein said motor is an electric motor having a drive shaft coupled with said ring gear.

7. The agricultural seeding machine of claim 6, further including a controller coupled with said electric motor, said controller controllably operating said electric motor to speed up or slow down rotation of said ring gear.

8. The agricultural seeding machine of claim 7, further including a sensor coupled with said controller, said sensor positioned to sense a speed of said seed meter associated with said driven shaft.

9. The agricultural seeding machine of claim 6, wherein said electric motor has a worm gear attached to said drive shaft and coupled with said ring gear.

10. The agricultural seeding machine of claim 9, wherein said ring gear includes a plurality of teeth on an outer periphery thereof, said worm gear being engaged with said plurality of teeth on said outer periphery.

11. An agricultural seeding machine, comprising:
    a seed meter, including a driven shaft rotating at a speed being driven by a primary power source; and
    an electromechanical variable speed drive for said seed meter, including a planetary gear set having an output shaft connected with said driven shaft, a ring gear, and a motor coupled with said ring gear, said motor moving said ring gear to adjust said speed of said driven shaft, said motor producing secondary power.

12. The agricultural seeding machine of claim 11, wherein said planetary gear set includes a sun gear and a plurality of planetary gears interconnecting said sun gear and said ring gear.

13. The agricultural seeding machine of claim 11, wherein said motor is an electric motor having a drive shaft coupled with said ring gear.

14. The agricultural seeding machine of claim 13, further including a controller coupled with said electric motor, said controller controllably operating said electric motor to speed up or slow down rotation of said ring gear.

15. The agricultural seeding machine of claim 14, further including a sensor coupled with said controller, said sensor positioned to sense a speed of said seed meter associated with said driven shaft.

16. The agricultural seeding machine of claim 13, wherein said electric motor has a worm gear attached to said drive shaft and coupled with said ring gear.

17. The agricultural seeding machine of claim 16, wherein said ring gear includes a plurality of teeth on an outer periphery thereof, said worm gear being engaged with said plurality of teeth on said outer periphery.

* * * * *